Figure 1:
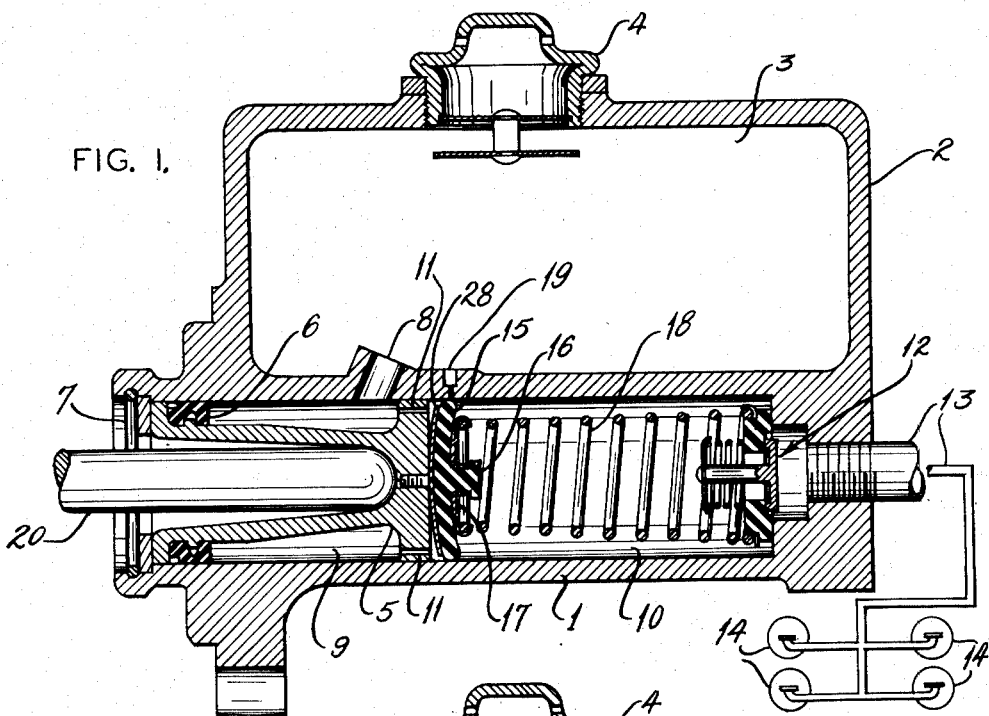

Oct. 27, 1953

A. BRUNNER 2,656,680

DISK TYPE FLUID PRESSURE SEAL

Filed Oct. 17, 1947

2 Sheets-Sheet 1

INVENTOR:
Albert Brunner,
By Carr & Carr & Gravely
HIS ATTORNEYS.

Patented Oct. 27, 1953

2,656,680

UNITED STATES PATENT OFFICE 2,656,680

DISK TYPE FLUID PRESSURE SEAL

Albert Brunner, Jennings, Mo., assignor to Wagner Electric Corporation, St. Louis, Mo., a corporation of Delaware Application October 17, 1947, Serial No. 780,397

2 Claims. (Cl. 60—54.6)

This invention relates to cylinders for use with fluid actuated systems and in its more specific aspects is directed to a disc type of piston seal for use in conjunction with the movable piston associated therewith.

The heretofore accepted seal for pistons used to convert fluid pressure into mechanical forces or vice versa, as applied particularly to hydraulic braking systems for motor vehicles, has consisted of a generally cup-shaped member of a resilient material such as natural or synthetic rubber. This configuration has proven very satisfactory in many cases but in others where a compensating port is introduced between a fluid storage reservoir at atmospheric pressure and the pressure system in such a manner that there can be a free flow of fluid when the actuating piston is in its furthermost retracted position there is a decided "buildup" of pressure on the internal surface of the cup before the external surface has passed the compensating port which causes material of the cup to be forced into the compensating port and, as the cup moves further, a consequent shearing action takes place until eventually a leak is formed through which the fluid may by-pass the piston or cause the compensating orifice to be plugged up. Either or both of these conditions may cause a malfunction of the fluid system. A further disadvantage of cup shaped seals is that added length must be provided on the cylinders in which they are used to take care of the lip of the cup. This added volume serves no useful purpose in many cases and could be eliminated should a seal not having a lip be used.

Accordingly, the principal object of this invention is to provide a substantially disc shaped pliable seal which will prevent the actuating fluid from escaping from the system at points adjacent to the moving parts thereof when pressure is applied and yet will allow free movement of said moving parts.

Another object is to provide a seal which, when used in conjunction with a cylinder having a compensating port through which fluid from the storage reservoir is introduced into the fluid actuated system, will be capable of moving past said port before sufficient pressure is built up to cause a flow of the yieldable material into the compensating port and a consequent cutting or shearing away of a portion of said yieldable material.

Figure 2:
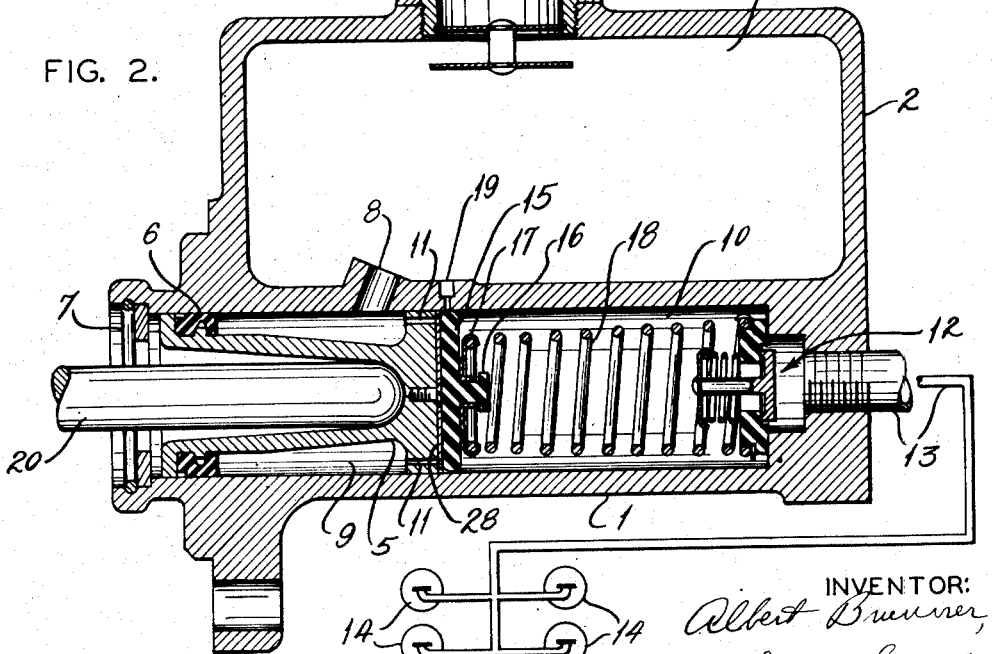
Figure 3:
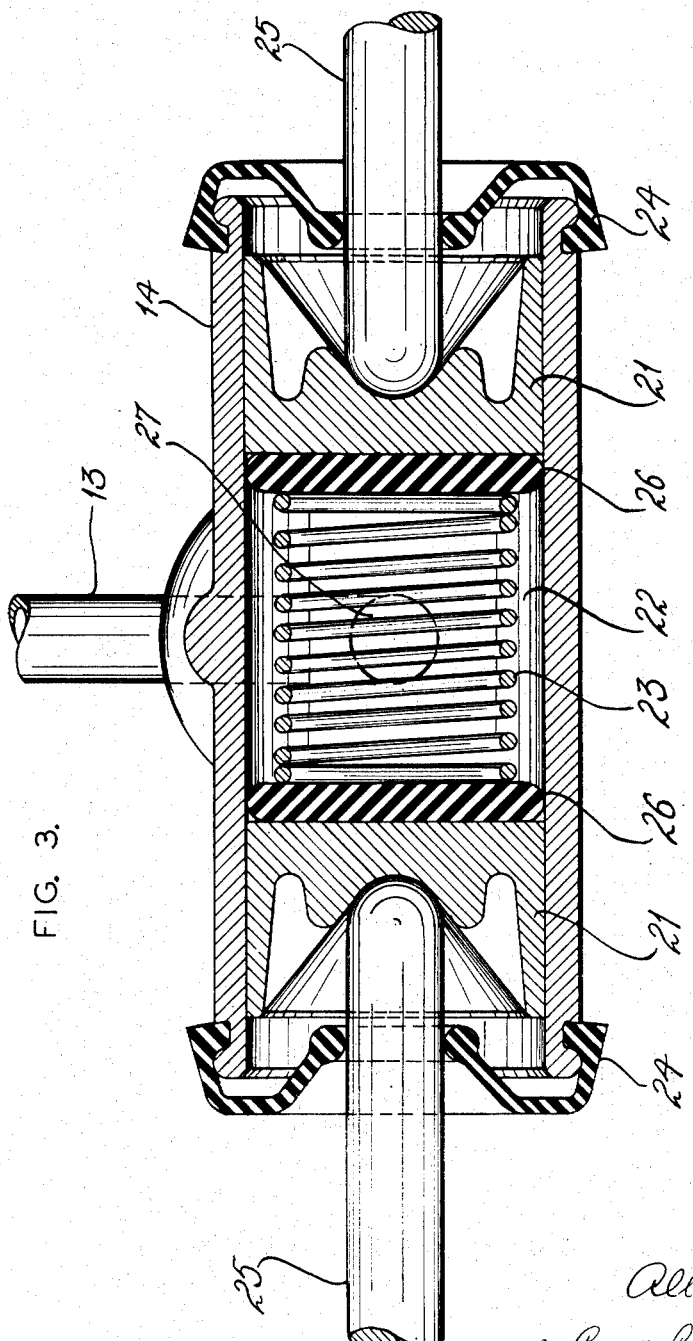

In the drawing:

Fig. 1 is a vertical sectional view of a master cylinder provided with a storage reservoir, showing the piston in its completely retracted position, Fig. 2 is a view similar to Fig. 1 in which the piston has started its forward stroke; and Fig. 3 is a sectional view of a brake operating motor showing its two pistons in their retracted positions.

Referring to Fig. 1, the cylinder 1 is associated with a housing 2 containing a fluid reservoir 3. The housing 2 is provided with a filler cap 4 for the reservoir which is so arranged as to prevent splashing of the fluid and at the same time retain atmospheric pressure thereon at all times. A spool type piston 5 of the type shown in United States Patent No. 1,967,664, is slidably disposed in the bore of cylinder 1 and has a ring-shaped resilient seal 6 at its outward end to prevent the escape of fluid from the reservoir 3 through the port 8 which establishes communication between the reservoir and the space 9 about the body of the spool-shaped piston 5. Suitable stop means 7 are provided at the open end of cylinder 1 to prevent piston 5 escaping therefrom. In order that fluid may pass freely through space 9 to the space 10 ahead of the piston upon the return stroke, a plurality of ducts 11 are provided in the head of the piston 5. The ducts 11 are provided with a star-shaped spring flapper valve 28 fastened to the head of the piston 5 which prevents the yieldable material of the seal 15 intruding into the ports when fluid pressure is built up in the space 10.

A piston seal 15, substantially disc shaped, whose periphery is preferably semi-circular in cross-section and whose diameter is slightly larger than the bore of chamber 10 is disposed between the chamber 10 and the head of piston 5. The opposite end of chamber 10 is closed by a valve 12 which is similar to that described in United States Patent No. 2,349,416. Between the disc seal 15 and the valve assembly 12 is disposed the helical spring 18 which serves to close the valve 12 and to return the piston 5 to its initial position when pressure on the actuating rod 20 (connected to an operating means not shown) has been relieved and the pressure in the fluid line 13 connecting the master cylinder to the brake operating motors 14 has fallen to a predetermined value.

A compensating port 19 so located as to allow fluid to pass freely between the chamber 10 and reservoir 3 when the piston 5 is in its fully retracted position allows for compensation of the fluid in the system under changing temperature conditions of the fluid.

In order to assure the correct alignment of the spring 18 with the disc seal 15 a projection 16 is formed on said disc over which is placed the spring retainer 17 in which is seated the end of said spring.

The disc seal 15 is made of a comparatively thin resilient material such as natural or synthetic rubber between 1/16" and 1/8" in thickness exclusive of the projection 16 which is moulded or otherwise formed as part of the disc seal. The thickness of the disc seal is determined by the diameter of the bore of the cylinder 1 in which it is to be used. Due to the diameter of the disc seal 15 being slightly larger than that of the cylinder bore, the disc seal will present a slightly dished appearance when the piston 5 is completely retracted as shown in Figure 1. When in this condition the disc seal will just clear the compensating port 19, thus allowing free passage of fluid therethrough.

The action of this master cylinder is such that when the rod 20 is moved a very short distance it moves the piston 5 to the right, as shown in Fig. 2, causing the disc seal 15 to radially compress and in turn be pressed against the flat face of the piston 5, thus closing the ports 11 by means of the star-shaped spring flapper valve 28 before said disc seal begins to move forward. The compression of the disc seal 15 however, is not enough to cause a material distortion of the semi-circular portion of the periphery of the disc seal, therefore, it still presents substantially line contact with the wall of the cylinder. Further slight movement of rod 20 to the right then causes the piston 5 to push the disc seal 15 past the compensating port 19 whose diameter at this point is of the order of 0.025" to 0.030" before a substantial pressure is built up in the system and thereby prevents any extrusion of the resilient material of the disc seal into the compensating port 19 with a consequent shearing action taking place on said disc seal. Similarly, as the pressure is relieved on rod 20, piston 5 returns to its initial position, thus lowering the pressure within the system to such a value by the time it passes the compensating port 19 that when the periphery of the disc seal 15 passes the compensating port 19, no resilient material is forced into the compensating port and no shearing action occurs in the periphery of the disc seal.

The disc seal may be applied to pressure fluid motors as well as to master cylinders as shown in Fig. 3. In this figure, motor 14, having two movable pistons therein, acts to produce a mechanical force against the rods 25 which, in turn, transmit the force to the load (not shown) in response to fluid pressure transmitted to the motor through the fluid line 13 which communicates with the space 22 through the port 27. The fluid is prevented from escaping around the pistons 21 by the disc seals 26 which are held in contact with the pistons 21 by the helical spring 23. The disc seals 26 are similar in both design and material to those described above in connection with disc seal 15 associated with the master cylinder. The dirt shields 24 prevent foreign material entering the motor and thus causing cutting of the polished surface of the motor cylinder and pistons.

The advantage of using the disc seal in the motor is that the assembly operation is easier in that no attention is required to determine which side of the disc seal is placed against the piston as is the case with the conventional cup-shaped seal. Further, it is possible to procure a greater length of travel since there are no overhanging lips on the resilient disc seal for which space must be provided or conversely, for a given travel a shorter motor cylinder is required.

In operation, fluid enters the motor 14 from the fluid line 13 through the port 27, thus raising the fluid pressure in the space 22 between the disc seals 26 which, being fabricated of a resilient material, tend to compress axially and consequently expand radially against the walls of cylinder 14, thus creating a fluid-tight seal therebetween. When the fluid pressure increases sufficiently to overcome the resistance offered by the load connected to the rods 25, the pistons 21 and the rods 25 move outwardly away from the center line of the motor cylinder. The disc seals 26, presenting substantially a line contact with the walls of motor cylinder 14, move readily and with less friction than would be the case with the design of cup which presents more area of contact with the cylinder wall. Upon the release of pressure on the fluid line, the load causes the rods 25 to force the pistons 21 back to their fully retracted position against the force of the spring 23 which is so proportioned as to merely hold the disc seals in position against the heads of pistons 21 under conditions of zero pressure in the space 22.

What I claim is:

1. In a fluid pressure producing cylinder having a bore therein, a compensating port in the wall of said cylinder bore, a piston slidably disposed in said cylinder, a thin disc shaped sealing member of resilient material associated with the head of said piston, the sealing member having a diameter slightly larger than the diameter of said cylinder bore, the periphery of the sealing member having a semicircular cross section, said member having a substantially line contact with the cylinder bore under low pressure conditions and having a substantially surface contact with the cylinder bore under high pressure conditions, the member being capable of flexing away from the piston head during return movement of said piston and under low pressure conditions, the member lying against the head when under high pressure conditions, the piston head and member being rearwardly of said port when fully retracted with the member being flexed away from said piston head and having a substantially line contact with said bore, and being pressed against the piston head at the beginning of the pressure producing stroke of said piston with the periphery of said member remaining in a substantially line contact with said bore until passing said port whereupon the periphery of said member is caused to be in a substantially surface contact with said bore to effectively seal off the bore to the rear of the piston, whereby a small part of the periphery of said member is presented to said port during movement thereby to prevent cutting of said sealing member.

2. The structure as defined in claim 1 wherein the piston has a plurality of ports therein through which the fluid may pass during the return movement of the piston and the sealing member is of such a thickness that it will readily flex to control the passing of the fluid through the ports while still maintaining a complete seal of the piston when under high pressure conditions.

ALBERT BRUNNER.

References Cited in the file of this patent

UNITED STATES PATENTS

| Number | Name | Date |
|---|---|---|
| 1,270,835 | Jersemann | July 2, 1918 |
| 1,711,450 | Davis | Apr. 30, 1929 |
| 1,967,664 | Dick | July 24, 1934 |
| 2,156,120 | La Brie | Apr. 25, 1939 |
| 2,419,401 | Hinds | Apr. 22, 1947 |
| 2,496,260 | Baldwin | Feb. 7, 1950 |